(No Model.)
D. O. SMITH.
BOILER CLEANING DEVICE.
No. 541,461. Patented June 25, 1895.
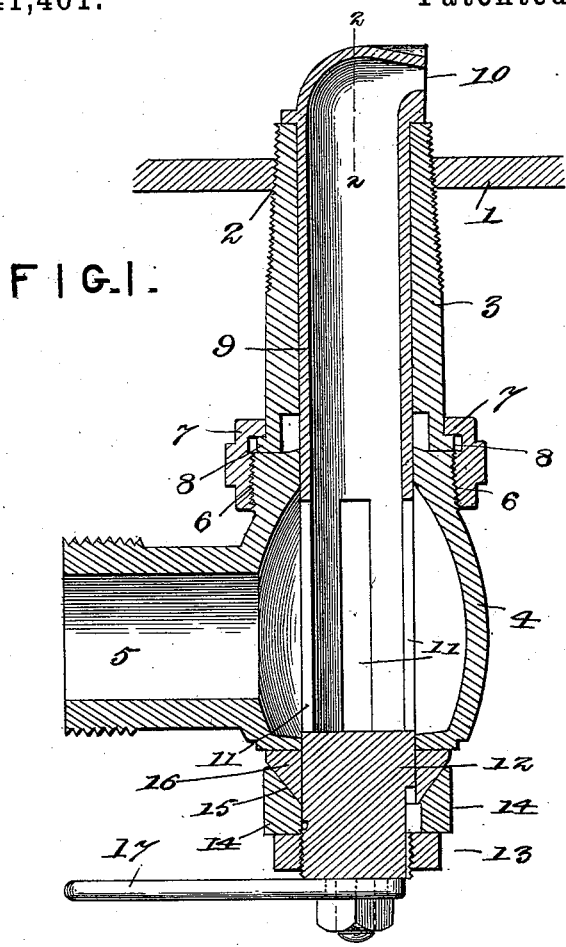
FIG. 1.
FIG. 2.
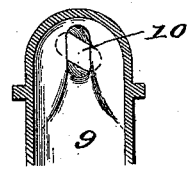
FIG. 3.
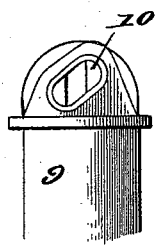
FIG. 4.
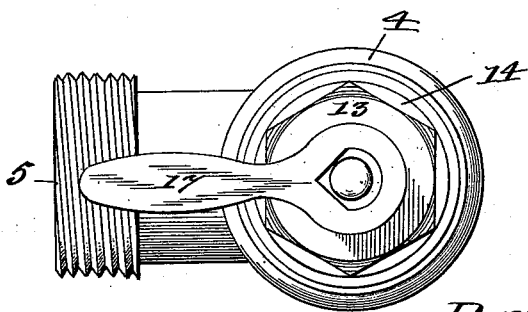
Inventor
Dyonicious O. Smith
Witnesses
E. H. Monroe
By his Attorneys.
C A Snow & Co.

UNITED STATES PATENT OFFICE.

DYONICIOUS OLIVER SMITH, OF WHISTLER, ALABAMA.

BOILER-CLEANING DEVICE.

SPECIFICATION forming part of Letters Patent No. 541,461, dated June 25, 1895.

Application filed July 12, 1894. Serial No. 517,351. (No model.)

*To all whom it may concern:*

Be it known that I, DYONICIOUS OLIVER SMITH, a citizen of the United States, residing at Whistler, in the county of Mobile and State of Alabama, have invented a new and useful Boiler-Cleaning Device, of which the following is a specification.

My invention relates to devices for cleaning steam and other boilers, and it has for its object to provide a permanent attachment for locomotive and other boilers, whereby a hose from a water supply may be connected in order to facilitate the flushing of the interior to remove accumulations of silt, lime, and other impurities which usually are precipitated upon the sides of a boiler as well as the flues, flue-sheets, &c.; and to provide means for projecting the stream of water in all directions through the boiler to remove such accumulations from all parts thereof.

Further objects and advantages of the invention will appear in the following description, and the novel features thereof will be particularly pointed out in the appended claims.

In the drawings, Figure 1 is a vertical central sectional view of a device embodying my invention applied in the operative position to a boiler. Fig. 2 is a partial sectional view of the discharge end of the nozzle upon the plane indicated by the line 2 2 of Fig. 1 to show the spiral twist in the outlet. Fig. 3 is a face view of the outlet. Fig. 4 is a view of the outer end of the device.

Similar numerals of reference indicate corresponding parts in all the figures of the drawings.

1 designates a portion of the boiler provided, preferably in its bottom, with a tapped opening 2 in which is threaded the upper end of the tubular shell 3. To the lower or outer end of this shell is connected a casing 4, having a side inlet 5 exteriorly threaded for attachment to a hose, (not shown,) whereby water is conveyed to the interior of the casing during operation. The upper end of the casing is connected to the contiguous end of the shell by means of a threaded union 6 having a rim 7 engaging a flared flange 8 on said shell. Mounted rotatably in the shell and casing is the tubular nozzle 9, provided with a laterally deflected discharge end 10 which is arranged in the boiler and having elongated openings or slots 11 within the casing to allow the entrance of water from the latter. The lower solid end 12 of the nozzle, which projects beyond the end of the casing, is fitted with a nut 13 which bears upon a washer 14 having a conical cavity 15 to engage a conical cushion 16, of rubber or similar material. Secured to the extremity of the nozzle is an operating handle 17. The discharge end or outlet of the nozzle is spirally twisted to correspondingly twist the stream of water as it leaves the device, and by means of the operating handle the nozzle may be turned in all directions to insure the effective cleansing of the interior of the boiler, including the flues and sheets. The boiler is preferably tapped for the device adjacent to one of the flue-sheets.

It will be understood that while I have illustrated the discharge end of the nozzle as bent laterally I do not desire to be limited to this specific shape, as under certain circumstances it may be found expedient to adopt other arrangements, and furthermore it is obvious that various other changes in the form, proportion, and minor details of construction may be resorted to without departing from the spirit or sacrificing any of the advantages of the invention. In will be understood, furthermore, that while I have shown and described the cleaning device as a permanent attachment of a boiler, it is adapted for such use particularly in connection with the boilers of stationary and marine engines, while with locomotive engines it may be applied and detached as desired, whereby a single cleaning device may be used in connection with a number of boilers.

Any suitable means for closing the opening provided for the reception of the upper end of the device may be employed.

Having thus described my invention, I claim—

1. In a boiler cleaning device of the class described, the combination of a shell adapted to be secured in an opening in a boiler, a casing attached to the outer end of the shell and adapted to be connected to a water supply pipe a nozzle revolubly mounted in said shell and casing and communicating with the latter, and means for turning said nozzle, substantially as specified.

2. In a boiler cleaning device of the class described, the combination with a shell adapted to be secured in an opening at the lowermost point of the side of a boiler, a casing attached to the outer end of the shell, a nozzle revolubly mounted in said shell and casing communicating with the latter, and having a lateral outlet within the boiler a conical compressible cushion, a washer having a conical cavity fitting said cushion, a nut engaging the exposed extremity of the nozzle and bearing against the washer, and a handle attached to the nozzle, substantially as specified.

3. As an article of manufacture, a boiler cleaning device having a threaded shell adapted to be threaded in an opening in a boiler, a casing detachably connected to the outer end of the shell, a nozzle revolubly mounted in said shell and casing and provided with openings or slots in the latter, said casing being provided with a lateral inlet, adjustable means for holding the nozzle in place, and an operating handle attached to the extremity of the nozzle, said nozzle being provided with a lateral outlet beyond the inner end of the shell, substantially as specified.

In testimony that I claim the foregoing as my own I have hereto affixed my signature in the presence of two witnesses.

DYONICIOUS OLIVER SMITH.

Witnesses:
J. D. GURGAUERS,
T. TIE DEMAN.